W. D. SCHMIDT.
MECHANICAL GEAR SHIFT.
APPLICATION FILED JUNE 28, 1920.

1,411,748.

Patented Apr. 4, 1922.

INVENTOR
WILLIAM D. SCHMIDT.
BY
HIS ATTORNEYS

W. D. SCHMIDT.
MECHANICAL GEAR SHIFT.
APPLICATION FILED JUNE 28, 1920.

1,411,748.

Patented Apr. 4, 1922.
5 SHEETS—SHEET 4.

INVENTOR
WILLIAM D. SCHMIDT.
BY
HIS ATTORNEYS.

UNITED STATES PATENT OFFICE.

WILLIAM DAVID SCHMIDT, OF EAU CLAIRE, WISCONSIN.

MECHANICAL GEAR SHIFT.

1,411,748.     Specification of Letters Patent.     Patented Apr. 4, 1922.

Application filed June 28, 1920. Serial No. 392,350.

*To all whom it may concern:*

Be it known that I, WILLIAM D. SCHMIDT, a citizen of the United States, resident of Eau Claire, county of Eau Claire, State of Wisconsin, have invented certain new and useful Improvements in Mechanical Gear Shifts, of which the following is a specification.

My invention relates particularly to mechanical gear shifts for automobiles or other automotive conveyances and the object of my invention is to eliminate the gear shift lever usually employed in such conveyances for shifting the transmission gears when changing the speed ratios between the motive power and traction wheels. This lever usually projects from the bottom in the center of an automobile or car, away from the steering wheel and is inconvenient both for the driver and passengers, and my purpose is to substitute for such lever an adjusting and indicating pointer or handle, preferably located on the steering post near the wheel, and adapted to be moved to the forward speed or reverse selected by the driver without first operating the clutch pedal and when thereafter the clutch pedal is depressed and again released, the gears will be caused to automatically shift to the speed indicated by the pointer or handle.

A further object is to accomplish this effect by simple, inexpensive mechanical means, that will not get out of order and that will entirely eliminate electrical appliances in its construction and use.

My invention consists in certain constructions and combinations, as will hereinafter be described and particularly pointed out in the claims, with reference to the accompanying drawings forming a part of this specification:

Figure 8:
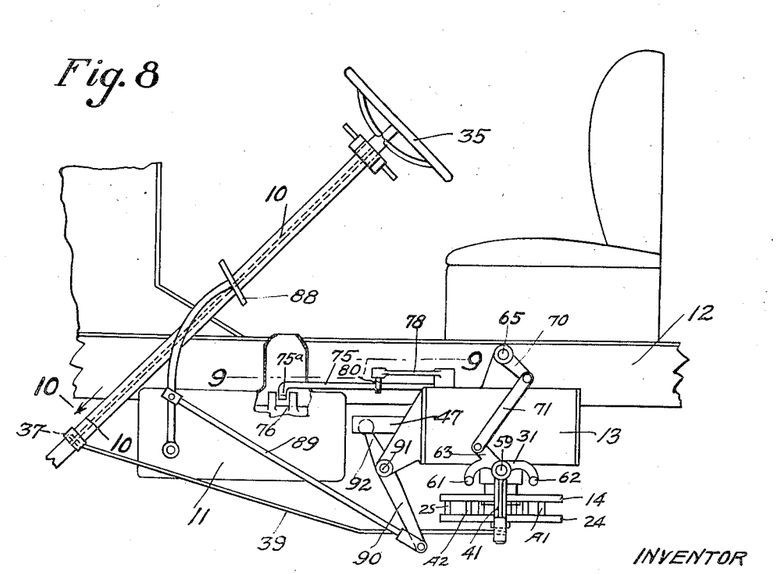
Figure 8 is a sectional view of a portion of the body of a vehicle, showing the steering post and transmission casing having my invention applied thereto.

Referring to Figure 8, 10 represents the steering post and 11 the transmission casing of any type of automotive vehicle, car, truck or tractor 12 to which my invention may be applied. In the rear of and to one side of the casing 11, I mount the shifter box 13 and secure it to the gear or transmission casing 11 by suitable brackets and bolts, not shown in the drawings, or to frame of car by means of cross straps supporting shaft.

I will now describe the speed adjusting or setting mechanism and thereafter the mechanism whereby the gears are caused to be shifted when the clutch pedal is depressed.

Referring now also to Figures 1 to 6, a disc 14 is mounted centrally below the box 13 upon a vertically supported sleeve 15 upon which the disc is free to rotate. The sleeve 15 is slidably mounted in a bearing 16 in the box 13 and is supported by rollers 17 upon studs 18 fastened to the sleeve. The rollers normally rest upon the bottom wall of the box 13 and the disc 14 is rotatably supported upon the disc by a bottom flange 20. A spindle 21, having a head 22 resting upon the sleeve 15 and supported in a bearing 23, passes slidably through the sleeve 15 and carries on its lower end a disc 24, rotatably mounted between collars 25 and 26. This disc 24 carries in one of its half-sections four pins, radially spaced for selecting the gear shifting element to contact with the desired gear and in the other half section four pins for actuating the element for shifting the selected gear. The selecting pins I have designated in Figure 4 with characters corresponding to the gear ratio they control, adding the letter "S," and the actuating pins are designated in a similar manner, preceded by the letter "A." A series of radially spaced holes are provided in both the selecting and actuating sections of the disc 14 and these holes co-operate with and are designated in like manner as the selecting and actuating pins with the addition of the letter "P" for the selecting section of the disc and the letter "H" for the actuating section.

These pins and holes co-act with shifter arms 31 and 32 and other devices hereinafter described for the shifting of the transmission gears, and their adjustment, caused by oscillating or swinging the disc 14 to any particular point in the arc of the circle relative to the shifter arms 31 and 32, determines the particular speed ratio to which the gears will be shifted when the clutch pedal is operated. The disc 14 is adjusted or set to the selected speed by operating the handle 33 upon a quadrant 34, preferably located under the steering wheel 35 upon the post 10. The handle 33 is secured to a spindle 19 mounted in bearings 36 and 37 upon the steering post 10 and having a crank arm 38 secured thereto. A rod 39 connects the crank arm 38 with an arm 40, pivoted at 40ª to a stationary bracket 41, depending from the shifter box 13, and a pin 42 projects upwardly from the arm 40 through slots 43 and 43ª in the discs 14 and 24, as shown particularly in Figures 3 and 4. It will be seen that by moving the handle 33 over the quadrant 34 the discs 14 and 24 will be oscillated correspondingly and the pins and holes of the discs may be registered properly with the shifter arms 31 and 32 for the desired gear speed ratio. Locking notches 44, designated correspondingly to the characters on the discs 14 are provided on the quadrant 34 and a suitable locking bolt 45 is provided in the handle 33 for engaging the notches 44.

Passing now to the shifting mechanism and referring to Figures 1, 2, 3 and 7, it will be understood that the actual operation of shifting the gears in the transmission casing 11 is effected by a vertical or upward movement of the discs 14 and 24, and actuated from the clutch pedal of the machine after the discs have been set to indicate the selected speed. For this purpose a yoke 46 having a projecting operating bar 47 is slidably mounted in ways 48 and 49 within the box 13 and its side members 50 and 51 are provided with cam blocks 52, 53 and 54, having inclined cam faces 55, 56 and 57 respectively. Rollers 58 upon studs 58ª are also provided on the head 22 of the spindle 21 and these rollers are adapted to enter between the cam faces 55 and 56 when the yoke 46 is moved in the direction of the arrow in Figure 7 and raise the head 22.

Figure 7:
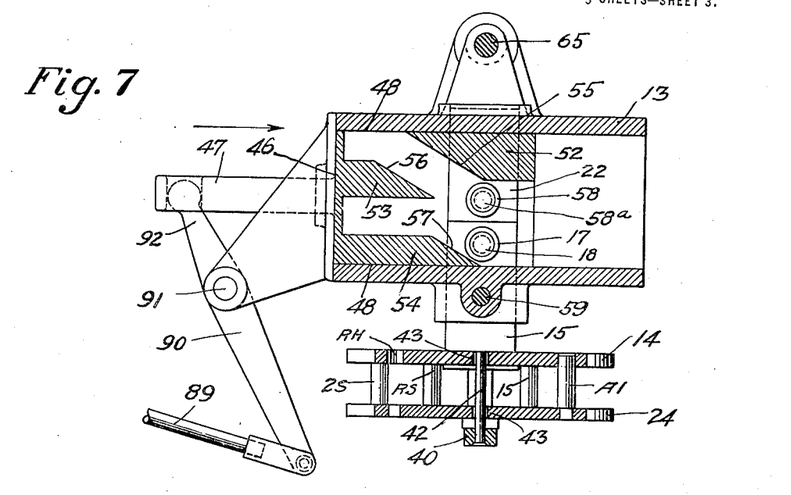
Figure 7 is a sectional view on the line 7—7 of Figure 3.

The inclined cam faces 57 of the blocks 54 will engage the rollers 17 of the sleeve 15 and as these cam faces are normally close to the roller 17, while the cam faces 56 are more remote from the rollers 58, the first effect of this movement will be to raise the discs 14 and 24 simultaneously a distance equal to the height of the cam block 54, after which, by a continued movement of the yoke 46, the disc 14 will remain stationary while the disc 24 will continue to move upwards and thereby push the pins "S" and "A" through their respective holes in the disc 14 to act on the shifter arms 31 and 32. These arms are pivoted on studs 59 and 60 and are provided with downwardly pointing, preferably rounded, ends 61 and 62 and a projecting arm 63. A rocker shaft 65 and a sleeve 66 through which the shaft 65 passes, are mounted in bearings 67, 68 and 69 and a crank arm 70 on the shaft 65 has a link connection 71 with the selective shifter arm 31 and a crank arm 72 on the sleeve 66 has link connection 73 with the actuating shifter arm 32. The sleeve 66 also carries a depending arm 74 keyed thereto and having universal link connection 74ª with a shifter rod 75, which extends into the transmission casing 11 to the usual gridiron 64 and is provided with a suitable head 75ª to engage the sliding gear shifting members 76 and 77 in place of the usual gear shifting lever. A bell crank arm 78 is pivoted to the shifter box at 79 and one of its arms slidably embraces the shifter rod 75, preferably by means of two pins 80. The other arm of the bell crank is provided with a slot 81 having a V-shaped catch 82 and spring-pressed bolt 83.

Figure 1:
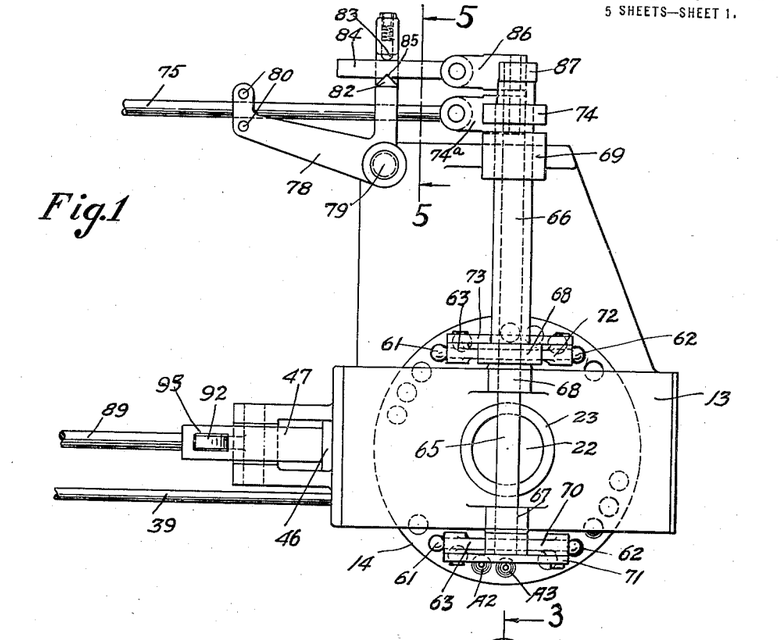
Figure 1 is a plan view of my device, showing the connecting rods from the device to the transmission casing, steering post and clutch pedal broken away.
Figure 2:
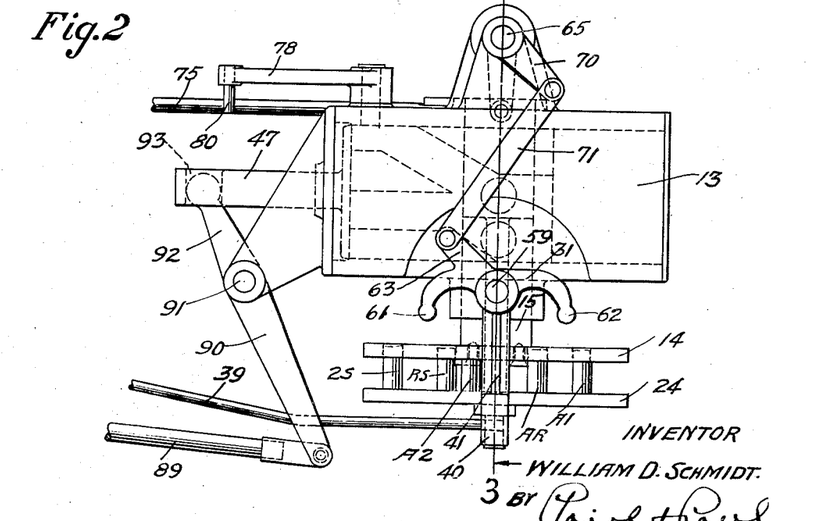
Figure 2 is a side elevation of Figure 1.

A bar 84, having a notch 85 normally held in engagement with the catch 82 by the spring bolt 83, is arranged in the slot 81 and is connected by a universal coupling 86 to a depending arm 87 keyed to the rock shaft 65. The bar 84 is held with sufficient force to the catch 82 so that either a forward or backward movement of the arm 87 will swing the bell crank and thereby the rod 75 from its neutral position in the gridiron 64 in engagement with one or the other of the gear shift members 76 and 77 and that, following the arrested movement of the rod 75 in the gridiron 64 and the continued movement of the bar 84, the catch will be forcefully released from the notch 85 and will slide on the bar 84. The sliding movement of the yoke 46 causing the vertical movement of the discs 14 and 24, as heretofore described, is induced by pressure on the clutch pedal 88, which has operative connection with the yoke 46 through a link 89 and a lever 90 pivoted at 91 and connected with its upper end 92 to the projecting bar 47 of the yoke 46, preferably by means of a slot 93, as shown in Figures 1 and 2.

Figures 9, 10, 11:
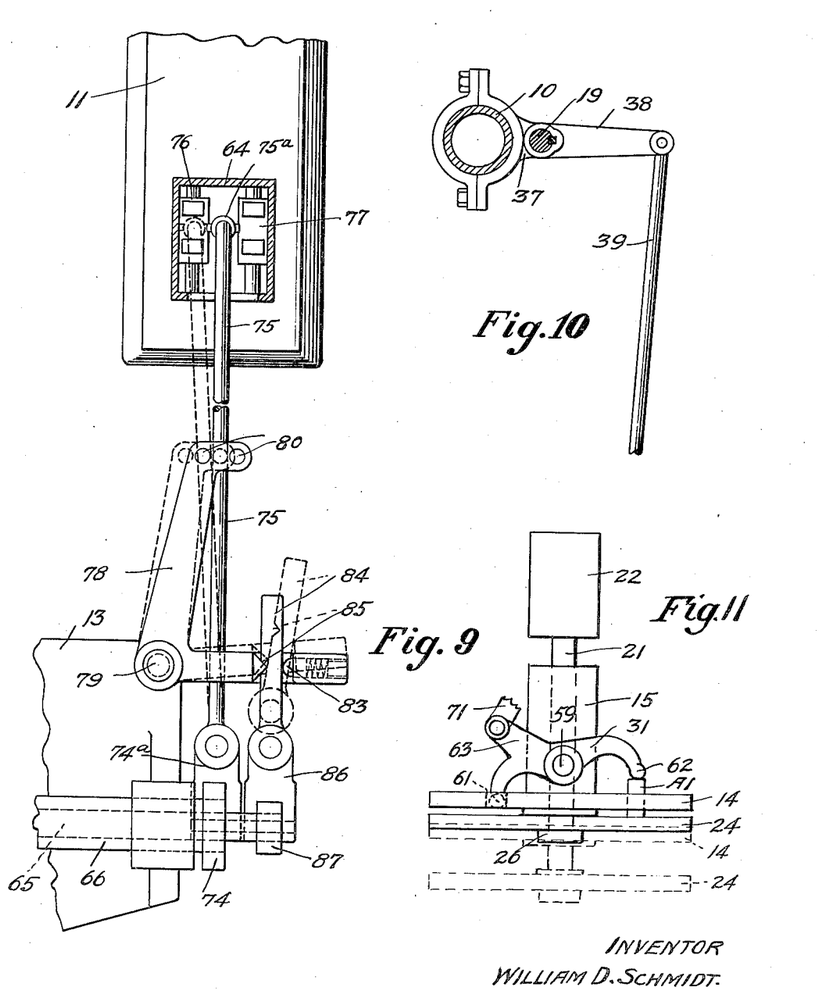
Figure 9 is a detail plan view taken on the line 9—9 of Figure 8, illustrating the operation of the gear shift.
Figure 10 is a detail on the line 10—10 of Figure 8.
Figure 11 illustrates the operation of the selecting mechanism.

Referring again to Figure 4, in the operation of shifting the gears, the handle is first moved to the desired speed indicated on the quadrant 34. This movement turns the discs 14 and 24 so that the two pins designated correspondingly on the disc 14 will be aligned directly under the proper ends of the shifter arms 31 and 32. In this position open holes are directly beneath the ends of the arms 31 and 32 opposite to the pins and when, therefore, the clutch pedal 88 is depressed to raise the discs 14 and 24, the first effect is to throw out the clutch of the engine while the discs move upwards together, and thereafter, when the lower disc 24 is pushed up to the disc 14, a pin on the selection side of the disc corresponding to the selected speed, will push upwards one end of the arm 31 to rock the shaft 65 and swing the shifter rod 75 in the proper direction in the gridiron 64, and immediately a pin on the actuating side of the disc will also push up one end of the arm 32 to rock the sleeve 66 and move the shifter rod longitudinally in the proper direction to shift the gears to the selected speed, the opposite ends of the arms 31 and 32 at the same time passing downwards through the open holes in the disc 14. It will be seen that any one of the indicated speeds or the reverse may be obtained by simply moving the handle 33 to the desired designation on the quadrant 34 and thereafter depressing and again releasing the clutch pedal. It will also be clear that when the clutch pedal is again released the discs 14 and 24 will be again forced down and restored to the original position shown in Figures 2 and 3 by the cam face 55 of the block 52, and that the discs will then be free of the arms 31 and 32 for the next adjustment and that these arms and other gear shifting parts will remain in the shifted position, as indicated in Figure 11, until after another adjustment of the discs 14 and 24 and that these discs again being raised, the shifter parts and gears will first be restored to neutral during the first upward movement of the discs, while the clutch is being released and that thereafter the gears will again be shifted to the selected new position in the manner and by the means above described.

Figures 3, 4, 5, 6:
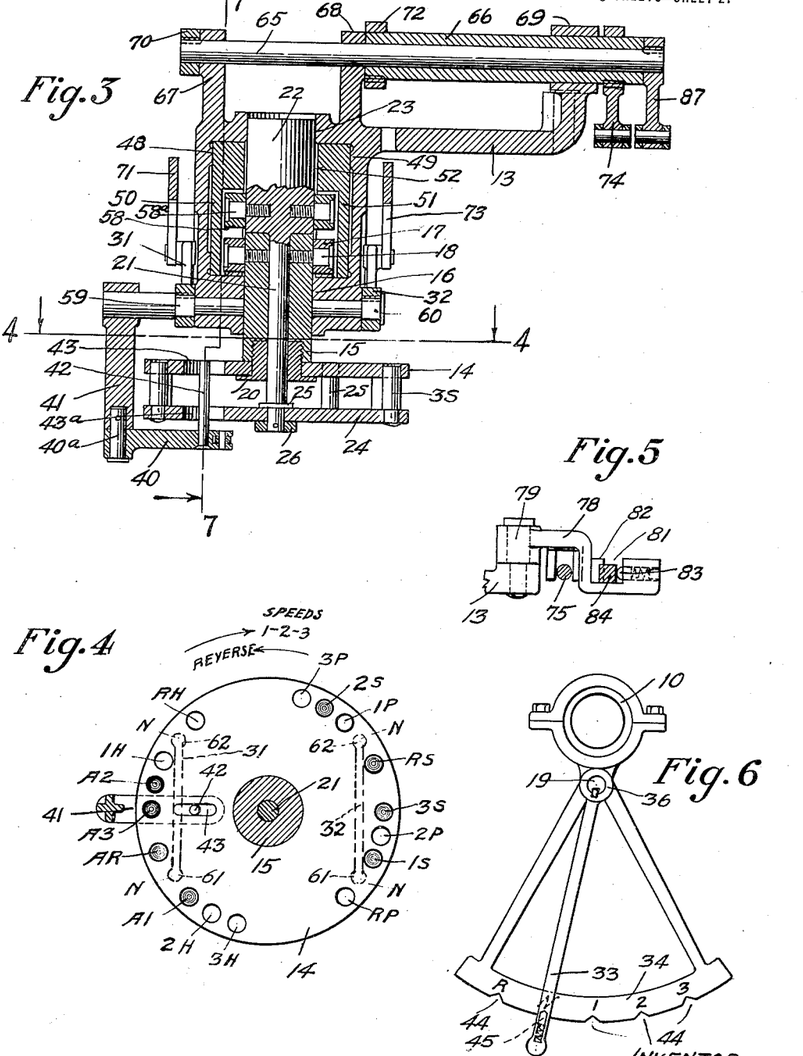
Figure 3 is a section on the line 3—3 of Figure 2.
Figures 4, 5 and 6 are detail views of the locating or setting mechanism for obtaining the different speed ratios or reverse.

It will also be understood that when the discs 14 and 24 are adjusted in neutral, the blank spaces designated "N" in Figure 4 are brought in alignment with the ends 61 and 62 of the shifter arms 31 and 32 so that when the pedal 88 is depressed to release the engine clutch the rising blank face of the disc 14 will act to restore the arms 31 and 32 to the level position and their connections as well as the transmission gears to the neutral position.

Figures 12, 13, 14, 15:
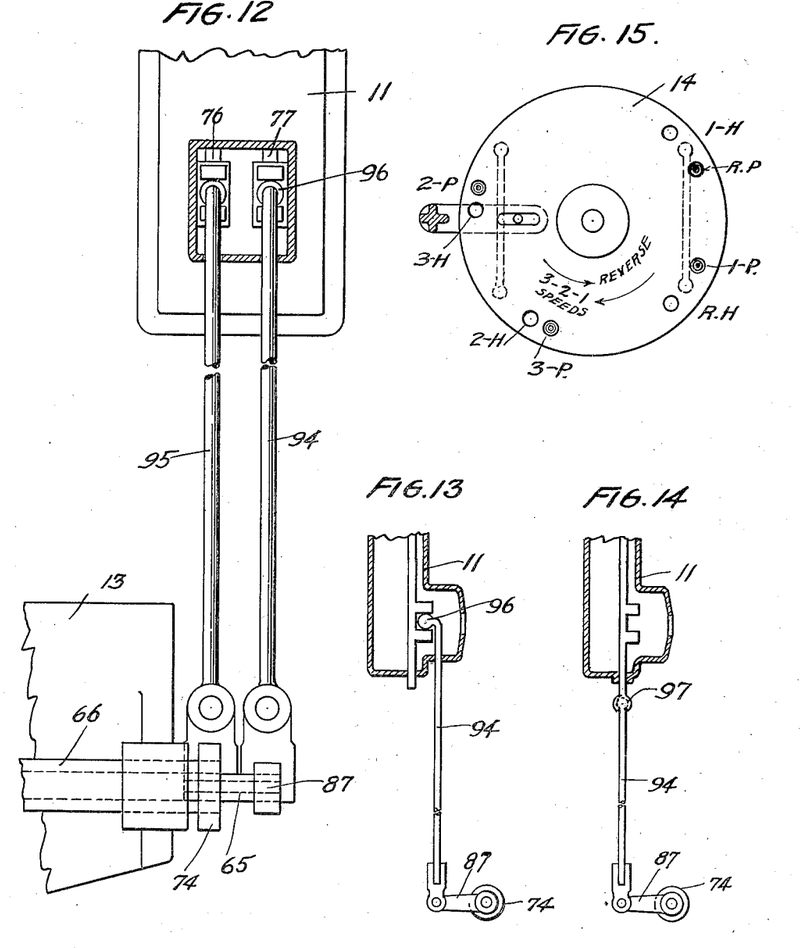
Figures 12, 13 and 14 show modified forms of connections from the device to the gear shifting members applicable to gear shifts where a cross over from one member to another is not necessary.
Figure 15 shows the modified form of the speed change controlling member needed in connection with the constructions shown in Figures 12, 13 and 14.

In Figures 12, 13, 14, and 15 I have illustrated a slight change in the construction of the device in order to adapt it to gear shifts where a shifting lever crossing from one gear shifting member to another is not used. As will be noted the shifting bell crank arm 78 is dispensed with, and sliding rods 94 and 95 are connected directly to the arms 74 and 87 and the gear shifting members 76 and 77. The rods 94 and 95 may be connected to these members in the gear casing by a head 96 as shown in Figures 12 and 13 or by a joint or coupling 97 outside the casing as shown in Figure 14. The operation of the device is substantially the same the shifter arm 31 controlling the sliding rod 94 through the shaft 65 and the shifter arm 32 controlling the sliding rod 95 through the sleeve 66. The pins and holes in the speed controlling discs 14 and 24 are rearranged and only 4 pins are needed to operate the shifter arms 31 and 32 as shown in Figure 15, where I have designated the pins with the letter "P" preceded by a character indicating their functions and the cooperating holes with the letter "H" preceded by the corresponding character.

It is evident that various modifications in the construction and details of this mechanism may be made without departing from the principle and scope of the invention, and I do not, therefore, wish to confine the claims to the exact construction shown.

I claim as my invention:

1. A mechanical gear shift comprising a shifter rod, a pair of rotating members having coacting elements and mounted for rotary adjustment and axially movable, means for rotating said members to select the gear to be operated, means for first moving both said members axially and then continuing such movement of one member and means actuated by the axial movement of said one member for operating said shifter rod.

2. A manually operated gear-shifting device comprising a revolving selective mechanism and means for adjusting it for the desired speed, a shifting mechanism, means actuated by the movement of said selecting mechanism for adjusting said shifting mechanism, means actuated by said selecting mechanism for operating said shifting mechanism to change the gear, and a treadle operated cam faced member for moving said selective mechanism axially independently of its revolving movement.

3. A mechanical gear shift comprising a shifting mechanism, revolving members concentrically mounted and axially movable, means for adjusting said members for the desired change of gear, and means for moving one of said members axially independently of the other member to operate said shifting mechanism.

4. A mechanical gear shift comprising a shifting mechanism, a revolving selective device and means for adjusting it for the desired change of gear, an arm connected with said shifting mechanism, pins mounted in said selective device for engaging said arm and a sliding yoke for moving said selective device axially to actuate said arm and shift the gear.

5. A mechanical gear shift comprising a shifting mechanism, revolving discs, one having a series of holes therein and pins mounted on the other disc for passing through said holes, means for moving said discs to operate said shifting mechanism, and a manually controlled device for moving one of said discs to change the position of the pins therein with respect to the holes in the other disc and thereby vary the degree of operation of said shifting mechanism.

6. A mechanical gear shift comprising a shifter rod, a revolving member and means for adjusting it for the desired change of gear, said member also having a reciprocating movement, mechanisms actuated by the reciprocation of said member for adjusting said rod and moving it longitudinally, and a treadle connected with said actuating mechanism.

7. A mechanical gear shift comprising a shifter rod, oscillating arms connected with said rod for imparting respectively an oscillating lateral movement and a longitudinal movement thereto, a selective device, means for revolving said selective device to select the gear to be operated, and means for moving said selective device to actuate said arms and shift the gear.

8. A mechanical gear shift comprising a shifter rod mounted for longitudinal movement to operate the gear shift to change the gear, revolving discs arranged one above the other, the upper disc having holes therein and the lower disc having pins to enter said holes, means for adjusting said discs, arms mounted above said discs and connected with said rod for oscillating it and moving it longitudinally, and means for raising said discs to engage and actuate said arms.

9. A mechanical gear shift comprising a shifter rod mounted for longitudinal movement to operate the gear shift to change the gear, revolving discs arranged one above the other, the upper disc having holes therein and the lower disc having pins to enter said holes, means for adjusting said discs, arms mounted above said discs and connected with said rod for oscillating it and moving it longitudinally, and a cam mechanism for raising said discs to actuate said arms.

10. A mechanical gear shift comprising a shifter rod, mechanism for adjusting said rod from a neutral to a shifting position, mechanism for actuating said rod to shift the gear, a selective device, a lever and means connecting it with said selective device for adjusting said device for the desired speed, a treadle, and means connected with said treadle for actuating said selective device to move said shifter rod and change the gear.

11. A mechanical gear shift comprising a shifter rod, a shaft, and a sleeve connected with said rod for shifting it laterally and moving it longitudinally, arms connected respectively with said shaft and sleeve for rocking them, a gear selective mechanism for actuating said arms, manually controlled means for adjusting said selective mechanism, and a treadle device for actuating said selective device and operating said arms.

12. A mechanical gear shift comprising a shifter rod, oscillating arms operatively connected with said rod for moving it laterally and longitudinally, revolving discs, one having a series of holes therein and pins mounted on the other disc for passing through said holes to engage said arms respectively, means for moving said discs to actuate said arms, and a manually controlled device for moving one of said discs to change the position of the pins therein with respect to the holes in the other disc and vary the degree of operation of said shifter rod.

13. A mechanical gear shift comprising a shifting mechanism, revolving members mounted for rotary and axial movement, means for adjusting said members for the desired change of gear, an arm connected with said shifting mechanism, and a sliding yoke for moving said members axially to actuate said arm and shift the gear.

14. A mechanical gear shift comprising a gear-shifting member, a speed-selecting member, manually adjustable, an actuating member connected to the selecting member and moving therewith, but being movable independently thereof, means for moving said actuating member, a rocker arm and means co-operating with said selecting and actuating members for moving said rocker arm and operating connections between said rocker arm and said gear-shifting member.

15. A mechanical gear shift comprising a gear-shifting member, a speed-selecting member manually adjustable, an actuating member connected to the selecting member and moving therewith but being movable independent thereof, a clutch pedal and means connected to said pedal for moving said selecting member and said actuating member, a rocker arm operable by said actuating member and said selecting member when said members are moved and operating connections between said rocker arm and said gear-shifting member.

16. A mechanical gear shift comprising a plurality of gear shift members, a speed selecting member, manually movable, an actuating member connected to said selecting member and moving therewith but being movable independent thereof, a clutch pedal and means connected to said pedal for moving said actuating member, a plurality of rocker arms, means for actuating said rocker arms co-operating with the actuating and the selecting members when the clutch pedal is moved, operating connections between said rocker arms and said gear shift members, and means for shifting said connections from one gear shift member to another.

17. In a mechanical gear shift the combination with a gear-shifting member, of a speed-selecting member and an actuating member manually adjustable but independently movable, a clutch pedal and mechanism for moving said selecting and actuating members by said pedal, a rocker arm mounted adjacent said members and having operative connections to said gear shifting member and means connected with said selecting and actuating members for rocking said arm in opposite directions according to the adjusted position of said members.

18. In a mechanical gear shift, the combination with gear-shifting members, of a speed-selecting member manually adjustable, an actuating member connected to the selecting member and adjustable therewith, a clutch pedal and mechanism for moving said selecting and actuating members, rocker arms mounted adjacent said members, means co-operating with said members and said rocker arms for rocking said arms singularly in opposite directions according to the adjusted position of said members, operative connections between said rocker arms and said gear-shifting members for moving said members singularly when one of said rocker arms is rocked, and means for shifting the movement between said members.

19. In a gear-shifting device, the combination, with a gear-shifting member, of a speed-selecting disc and an actuating disc, manually adjustable around a common axis, and axially movable, an operating handle for adjusting said discs around their axis, a speed designating device adjacent said handle, a clutch pedal, means connected to said pedal for axially moving said discs by said pedal, and means operable by the axial movements of said discs to move said gear-shifting member to a position designated by said operating handle and speed designated device.

20. In a gear-shifting device, the combination, with gear-shifting members, of a speed-selecting disc and an adjusting disc adjustable around a common axis and axially movable independent of each other, means for manually adjusting said discs around their axis, rocker arms mounted adjacent said discs and movable in opposite directions, means for axially moving said discs together and separately to rock one of said arms in a direction controlled by the adjusted position of said discs, connecting means between said arms and said gear-shifting members for moving one of said members when one of said arms is rocked, a shifter rod and means for shifting said rod from neutral and engaging one or the other of said members corresponding to the adjusted position of said discs and the particular arm rocked.

21. A mechanical gear shift comprising a shifter rod, an oscillating member connected with said rod for imparting a longitudinal movement thereto, a selective device, means for revolving said selective device to select the gear to be operated, and means for moving said selective device to actuate said member and shift the gear.

22. The combination, with a gear shifting member, of a speed selecting member and an actuating member manually adjustable around a common axis and axially movable, means for adjusting said members around their axis, a pedal, means connected with said pedal for axially moving said members, and means actuated by the axial movement of said members for operating said gear shifting member.

23. A mechanical gear shift comprising a shifter rod, mechanism for actuating said rod to shift the gear, a selective device, a lever and means connecting it with said selective device for adjusting said device for the desired speed, a treadle, and means connected with said treadle for actuating said selective device to move said shifter rod and change the gear.

24. A mechanical gear shift comprising a shifter rod, mechanism for actuating said rod to shift the gear, a selective device, a lever, and means connecting it with said selective device for adjusting said device for the desired speed, a treadle, and a sliding cam face member connected with said treadle for actuating said selective device to move said shifter rod and change the gear.

25. A mechanical gear shift comprising a shifting member, a speed selecting member and an actuating member manually adjustable around a common axis and axially movable, and means for moving said selecting member axially and said actuating member at the completion of their revolving adjustment and then subsequently continuing such movement of said actuating member to operate said shifting member.

26. A mechanical gear shift comprising a shifter rod mounted for longitudinal movement to change the gear, revolving discs arranged one above the other, the upper disc having holes therein and the lower disc having pins to enter said holes, means for adjusting said discs, and means actuated by the movement of said discs for operating said shifter rod.

27. A mechanical gear shift comprising a shifter rod, revolving discs arranged in opposing relation, one disc having holes and the other having pins to enter said holes, means for adjusting said discs to select the gear and means actuated by the axial movement of said discs for operating said shifter rod.

28. A mechanical gear shift comprising a shifter rod, an oscillating member connected with said rod for imparting a longitudinal movement thereto, a selective device comprising a disc mounted for axial and rotating movement, and pins mounted on said disc for engaging said oscillating member, means for rotating said disc to select the gear to be operated, and means for moving said disc axially to operate said member and shift the gear.

29. A mechanical gear shift comprising a shifter rod, a pair of rotating members having co-acting pins and holes, means for rotating said members to select the gear to be operated, means for moving said members axially, and means connected with said shifter rod and operated by said pins upon axial movement of said members.

30. A mechanical gear shift comprising a shifter rod, a speed selecting member and an actuating member mounted for adjustment around a common axis and axially movable, means for adjusting said speed selecting member, and means for initially moving both of said members axially and then subsequently continuing such movement of said actuating member to operate said shifter rod.

In witness whereof, I have hereunto set my hand this 31st day of May, 1920.

WILLIAM DAVID SCHMIDT.

Witnesses:
   A. H. LOOMIS,
   ALFRED I. FAGERLIE.